(No Model.) 2 Sheets—Sheet 1.

J. T. REED.
REFRIGERATING APPARATUS.

No. 252,622. Patented Jan. 24, 1882.

WITNESSES
W. J. Cambridge
A. J. Carswell

INVENTOR
J. Thornton Reed (No Model.) 2 Sheets—Sheet 2.
J. T. REED.
REFRIGERATING APPARATUS.
No. 252,622. Patented Jan. 24, 1882.
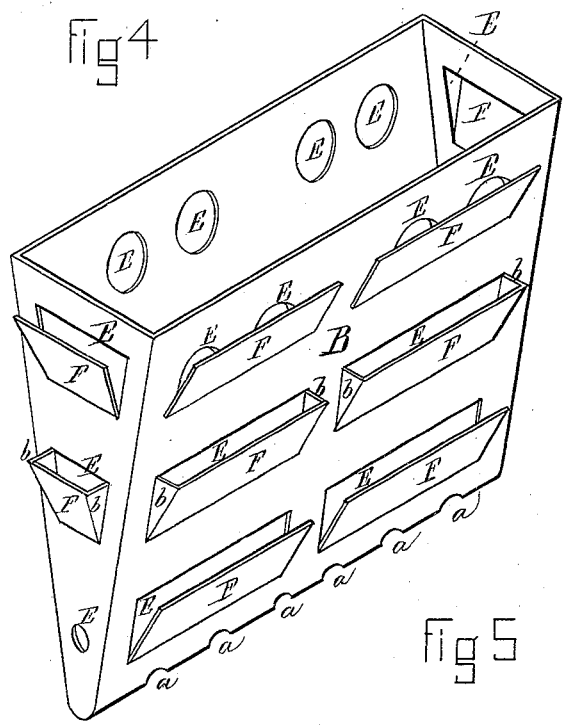
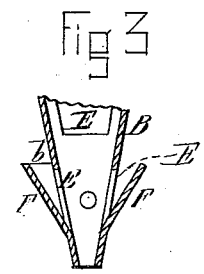
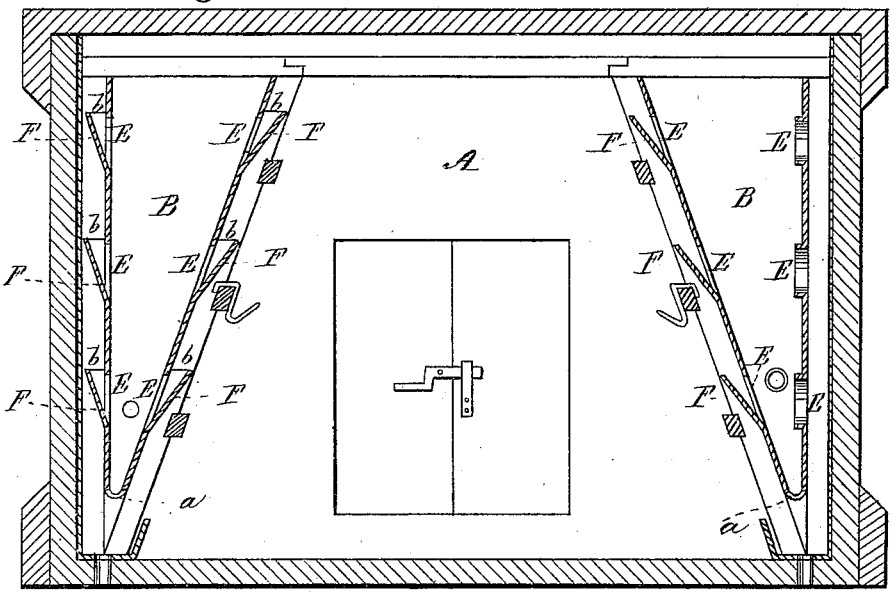
WITNESSES
W. J. Cambridge
H. J. Caswell
INVENTOR
J. Thornton Reed
per H. E. Teschemacher
Atty

UNITED STATES PATENT OFFICE.

J. THORNTON REED, OF BOSTON, MASSACHUSETTS.

REFRIGERATING APPARATUS.

SPECIFICATION forming part of Letters Patent No. 252,622, dated January 24, 1882.

Application filed July 20, 1881. (No model.)

*To all whom it may concern:*

Be it known that I, J. THORNTON REED, a citizen of the United States, residing at Boston, in the county of Suffolk and State of Massachusetts, have invented certain Improvements in Refrigerating Apparatus, of which the following is a full, clear, and exact description, reference being had to the accompanying drawings, making part of this specification, in which—

Figure 1:
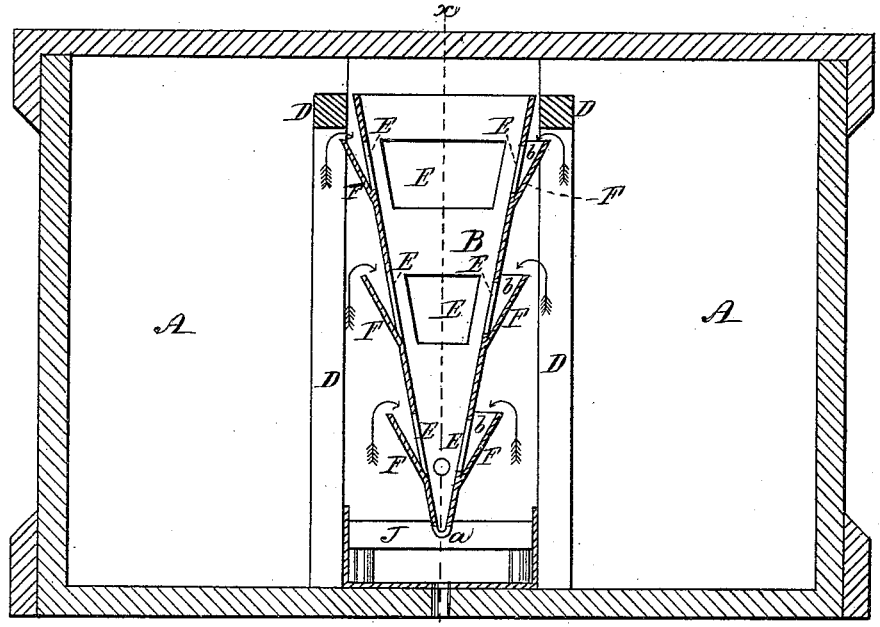
Figure 2:
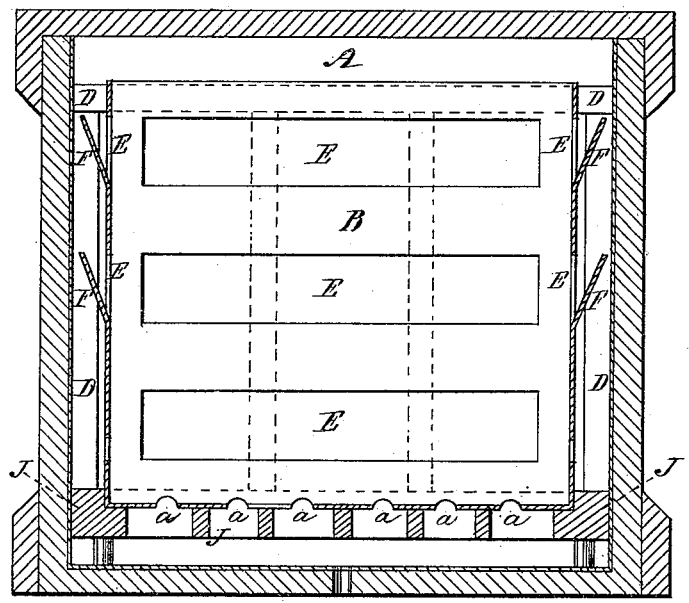

Figure 1 is a longitudinal vertical section of a refrigerating apparatus constructed in accordance with my invention. Fig. 2 is a transverse vertical section taken on the line $x$ $x$ of Fig. 1. Fig. 3 is a section of a slightly-modified form of the invention, the bottom of the tank or refrigerant-receptacle in this case being entirely open. Fig. 4 is a perspective view of the tank or refrigerant receptacle detached, showing a modification of the apertures and blind-like slats or guards. Fig. 5 illustrates a method for supporting the receptacle at the sides of the refrigerator.

This invention relates to that class of receptacles employed for holding ice and other refrigerants, in pipes or otherwise, for refrigerating or freezing; and it consists in arranging within the space or compartment for containing the meat or other articles to be preserved a tank or receptacle having a series of apertures in the sides and ends for admitting the air and gases into contact with the ice or other refrigerant or contact with the pipes containing the refrigerant.

It consists, secondly, in combining with a tank or receptacle having a series of apertures of the character last described a series of blind-like slats or guards, for the purpose of compelling the ascending air and gases to pass over the refrigerants employed in such a manner that said air and gases are absorbed and caused to pass off with the waste water. The apertures and the blind-like slats or guards are arranged in different parts and at different levels of the refrigerant tank or receptacle, in order that the air and gases may be admitted at different points vertically, and also so that they may be admitted at points lower or nearer to the bottom of the receptacle than has been done heretofore with tanks or receptacles of this class, thus enabling me to withdraw from the interior of the provision-compartment deleterious gases heavily charged with moisture, which have heretofore been unable to rise to a sufficient height to pass over the top of the ice-receptacle, and have consequently been forced down and deposited upon the surface of the meat or other articles, causing rapid decay.

Having thus explained the nature and purposes of my invention, I will describe one mode or mechanism which I have adopted for carrying it into operation.

In carrying out my invention I place within a space or compartment, A, for containing the meat or other perishable articles, a tank or receptacle, B, preferably made of galvanized iron. Other suitable material may be used in constructing the tank, and it may be of any appropriate shape, though I prefer that it should be V-shaped in cross-section. This tank B, which contains the refrigerant, is provided with apertures E, of any suitable number and shape. Thus the apertures may be in the form of long narrow openings, as shown in Figs. 2 and 4, or they may be round or short apertures, as shown in Figs. 4 and 5. Outside of these apertures are arranged blind-like slats or guards F, which are inclined upward and outward, as shown. I prefer to so construct these slats or guards that they shall extend above the upper edges of the apertures, in order that as the air and gases rise from the articles at the bottom of the compartment A they shall pass over the upper edges of the slats and through the apertures into the interior of the tank; but, on the other hand, the air and the gases and moisture within the tank cannot pass over the slats outward, but must pass downward through the tank to the bottom thereof.

The air which enters the tank through the apertures passes over the refrigerant therein, and the deleterious gases and the moisture are absorbed within the tank, and are discharged with the waste water, which passes out through a suitable opening or openings, $a$, in the bottom of the tank. The gases which rise from the articles within the compartment are of different densities, and are therefore not all able to rise to the same altitudes, and unless means are provided for admitting the different gases to the tank at different levels some of them will be deposited with the moisture on the sides of the refrigerant-tank and be returned to the articles below, and if not thus deposited they tend to remain in the lower part of the refrigerator and to injure the articles therein stored. I obviate entirely these difficulties by forming the apertures E in the tank at different points, extending them downward as far as practicable; and it will be seen that the gases which are too heavily charged with moisture to rise to the top of the tank B can find entrance at one or another of the lower apertures, and thus they can all be absorbed and carried off and prevented from injuriously affecting the articles in the bottom of the refrigerator.

My improved apparatus is especially adapted for use in the transportation of perishable goods, either by cars, steamers, wagons, or any conveyance that is in motion, where the gases are liable to intermingle and prevent the free circulation of air necessary to secure perfect refrigeration.

The tank B may be supported in various ways within the refrigerator or compartment A. Thus it may be vertically supported in the middle by means of braces or a suitable frame at D, as shown in Figs. 1 and 2, or by means of a frame, J, below it, or it may be supported against the side of the compartment, as shown in Fig. 5. The means of support should be of such a nature that the tank can be readily removed when necessary for cleansing the compartment or for any other reason.

The guards F should be connected with the wall of the tank at their ends, as seen at $b$ in Figs. 1, 3, 4, and 5, to obtain the best results, as air or gases might otherwise pass through the open spaces at the ends outward from the tank.

What I claim is—

1. A tank or receptacle for containing refrigerants, provided with apertures E and with inclined slats or guards F, for the purpose of admitting the ascending air and the gases at different levels and allowing them to pass over the refrigerants employed, substantially as and for the purpose set forth.

2. The within-described process or method of refrigerating, the same consisting in withdrawing the heavier air and gases from the compartment which contains the meats or other perishable articles at varying distances from its bottom and causing them to pass over the refrigerant, by which they are absorbed, substantially in the manner and for the purpose described.

3. In a refrigerator, a receptacle for refrigerants having its sides formed with apertures at different levels, substantially as and for the purpose described.

Witness my hand this 18th day of July, A. D. 1881.

J. THORNTON REED.

In presence of—
P. E. TESCHEMACHER,
WINFIELD S. SLOCUM.